United States Patent
Morris (10) Patent No.: US 7,038,876 B2
(45) Date of Patent: May 2, 2006

(54) CONTROL SYSTEM FOR A DATA STORAGE DEVICE WITH CONSTRAINT

(75) Inventor: John C. Morris, Minneapolis, MN (US)

(73) Assignee: Seagate Technology LLC, Scotts Valley, CA (US)

(*) Notice: Subject to any disclaimer, the term of this patent is extended or adjusted under 35 U.S.C. 154(b) by 242 days.

(21) Appl. No.: 10/353,602

(22) Filed: Jan. 29, 2003

(65) Prior Publication Data

US 2003/0197972 A1 Oct. 23, 2003

Related U.S. Application Data

(60) Provisional application No. 60/374,081, filed on Apr. 18, 2002.

(51) Int. Cl.
*G11B 5/596* (2006.01)

(52) U.S. Cl. .................................................. 360/78.05

(58) Field of Classification Search ............... 360/78.05, 360/77.06, 78.09, 78.12, 97.02, 97.03, 266.1
See application file for complete search history.

(56) References Cited

U.S. PATENT DOCUMENTS

| | | | |
|---|---|---|---|
| 5,978,752 A | | 11/1999 | Morris |
| 6,005,742 A | * | 12/1999 | Cunningham et al. ... 360/78.05 |
| 6,101,058 A | | 8/2000 | Morris |
| 6,166,890 A | | 12/2000 | Stefansky et al. |
| 6,266,205 B1 | * | 7/2001 | Schreck et al. ......... 360/77.06 |
| 6,519,109 B1 | * | 2/2003 | Price et al. ............. 360/78.09 |
| 6,600,622 B1 | * | 7/2003 | Smith ..................... 360/77.06 |
| 6,618,221 B1 | * | 9/2003 | Gillis et al. ............. 360/97.02 |
| 6,621,653 B1 | * | 9/2003 | Schirle ................... 360/78.12 |
| 6,700,736 B1 | * | 3/2004 | Wu et al. ............... 360/97.03 |
| 6,738,229 B1 | * | 5/2004 | Williams ................ 360/266.1 |

FOREIGN PATENT DOCUMENTS

| | | |
|---|---|---|
| WO | WO 01/01401 A1 | 1/2001 |
| WO | WO 01/52246 A1 | 7/2001 |

OTHER PUBLICATIONS

Holly R. Rapley and William C. Messner, "Controller Design For Two Stage Actuators Using The PQ Method and The Sbode Plot," Digest Of APMRC2000, Mechatronics & Tribology Group Of SRC (Tokyo, Japan), (Nov. 6, 2000).

Holly R. Rapley & William C. Messner, "Designing Controllers For Two stage Disk Drive Actuator Systems Using The PQ Method and The Sbode Plot," IEEE Transactions On Magnetics, IEEEMagnetics Society (Tokyo, Japan), vol. 37 (No. 2), p. 944–948, (Nov. 6, 2000).

* cited by examiner

*Primary Examiner*—David Hudspeth
*Assistant Examiner*—Fred F. Tzeng
(74) *Attorney, Agent, or Firm*—Westman, Champlin & Kelly, P.A.

(57) ABSTRACT

A control system for a data storage device including a constraint or weight to control stroke utilization and/or closed loop response of the control system. In particular, in one embodiment described, the weight or constraint is used to limit stroke utilization for a microactuator having a smaller stroke than a primary actuator. As described, the constraint or weight is used in conjunction with a mathematical synthesis to synthesize a controller to optimize system performance.

17 Claims, 13 Drawing Sheets

CONTROL SYSTEM FOR A DATA STORAGE DEVICE WITH CONSTRAINT

CROSS-REFERENCE TO RELATED APPLICATION

This application claims priority from U.S. Provisional Application No. 60/374,081 filed on Apr. 18, 2002 entitled "MINIMIZING REQUIRED STROKE OF MICROACTUATOR FOR DUAL-STAGE DISC DRIVE".

FIELD OF THE INVENTION

The present invention relates generally to data storage devices, and more particularly but not by limitation to control systems for data storage devices.

BACKGROUND OF THE INVENTION

Data storage devices store digital information on a rotating disc or data storage medium. Data storage devices include a head having a transducer element to read data from or write data to the disc or data storage medium. Heads are coupled to a primary or first actuator assembly which is energized to position the head relative to the disc surface for read-write operations. The primary actuator is coupled to a servo control system to provide head position control. Areal density is increasing requiring improved position control. In particular, as tracks per inch increase, track positioning error must decrease.

Secondary actuators or microactuators have been proposed to improve track misregistration or track positioning. Typically, the secondary actuator or microactuator moves the head over a smaller stroke or displacement to provide micropositioning for dual stage actuation. The primary, or first actuator, and the secondary actuator, or microactuator, collectively provide head positioning. Control system architectures for single actuation devices are not designed to optimize servo control for the secondary actuator or microactuator relative to system constraints. Embodiments of the present invention provide solutions to these and other problems, and offer other advantages over the prior art.

SUMMARY OF THE INVENTION

The present invention relates to a control system for a data storage device including a constraint or weight to control stroke utilization and/or closed loop response of the control system. In particular, in one embodiment described, the weight or constraint is used to limit stroke utilization for a microactuator having a smaller stroke than a primary actuator. As described, the constraint or weight is used in conjunction with mathematical synthesis to synthesize a controller to optimize system performance. These and other features and benefits that characterize embodiments of the present invention will be apparent upon reading the following detailed description and review of the associated drawings.

DETAILED DESCRIPTION OF ILLUSTRATIVE EMBODIMENTS

Figure 1:
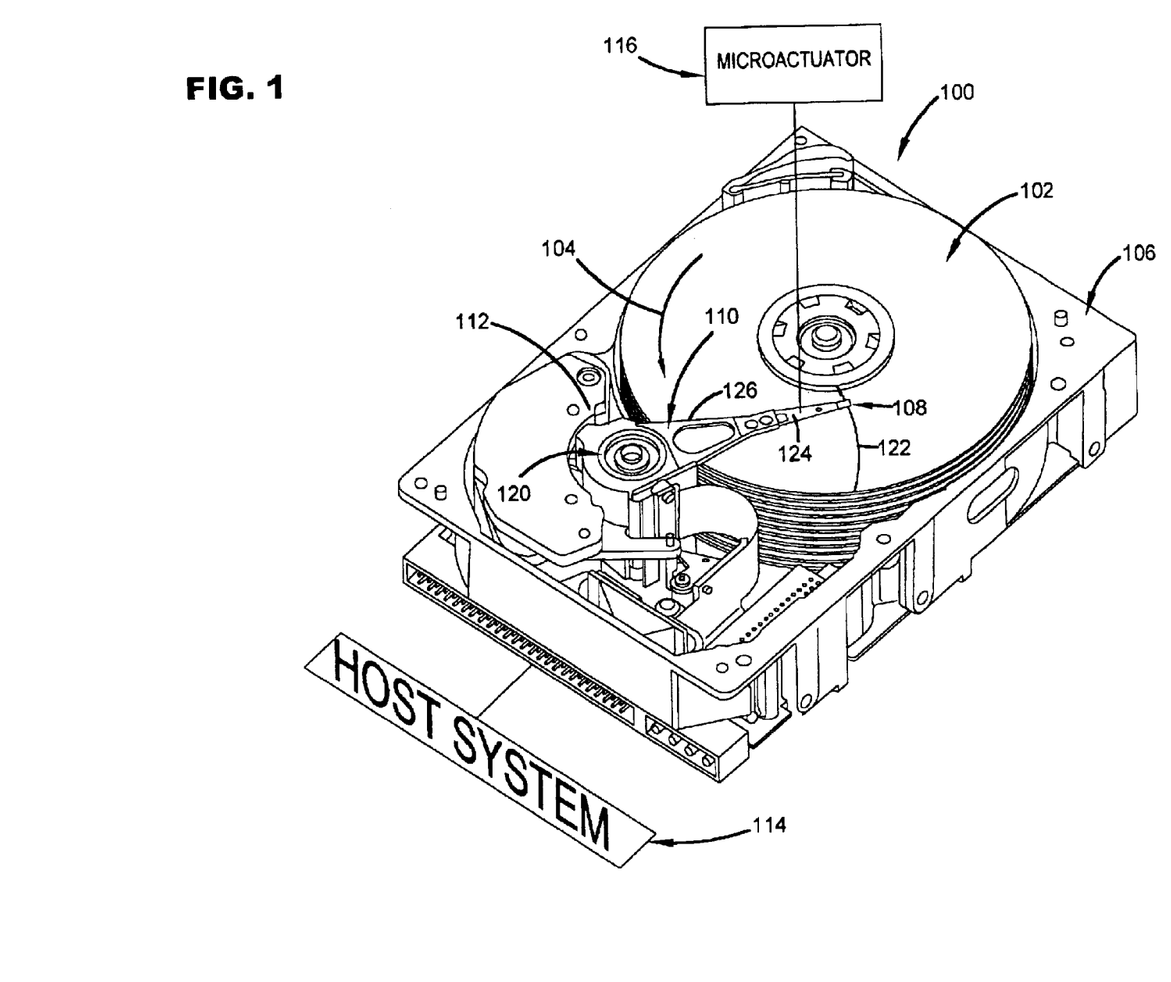
FIG. 1 is a perspective illustration of an embodiment of a data storage device.

FIG. 1 is a perspective illustration of an embodiment of a data storage device 100 for storing digital information. Device 100 includes a plurality of discs 102 (or single disc) to store digital information. The discs 102 are supported for rotation as illustrated by arrow 104 relative to a base chassis 106 by a spindle motor (not shown). Heads 108 (only one shown in FIG. 1) are coupled to an actuator assembly 110 including a voice coil motor or actuator 112 which is energized to position the heads 108 relative to data tracks on the disc to read data from or write data to the disc through interface with a host system 114.

As previously described, areal density and tracks per inch is increasing, demanding improved head positioning control. The size and response of the actuator 112 limits response or positioning control of the head 108. Microactuators as illustrated in block 116 are coupled to the head to provide a smaller actuation stroke for fine head positioning control relative to the voice coil motor or primary actuator 112.

In particular, in the illustrated embodiment, heads 108 are supported relative to an actuator E-block 120 rotationally coupled to the base chassis 106. Energization of the voice coil motor 112 rotates the actuator E-block 120 to move the heads along a positioning stroke or arcuate path 122 between an inner diameter and outer diameter of the disc. Heads are coupled to suspension assemblies 124 (only one shown in FIG. 1) coupled to actuator arms 126 (only one shown in FIG. 1) of the actuator E-block 120.

In the illustrated embodiment, microactuators 116 are coupled to suspension assemblies 124 to move the head 108 along a micro positioning stroke or smaller stroke than the primary actuator or voice coil motor 112 to provide fine head positioning along a relative small stroke. Microactuator 116 can be a piezoelectric microactuator, an electrostatic microactuator, an electromagnetic microactuator, or a shape memory actuator. Although a particular microactuator 116 is described and illustrated, application of the present invention is not limited to any particular microactuator structure or embodiment.

Figure 2:
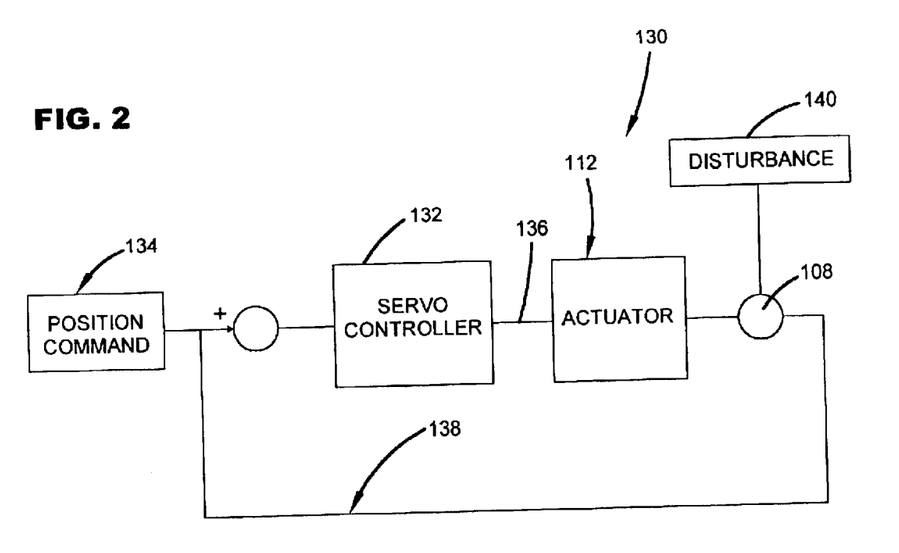
FIG. 2 is a schematic illustration of an embodiment of a control system for an actuator to position a head for read-write operations.

As shown in FIG. 2, operation of the actuator or voice coil motor 112 is controlled by a servo control system 130 using embedded servo positioning information. As shown in FIG. 2, a servo controller 132 receives a seek or input command from the host system as illustrated by block 134. The servo controller 132 provides a current or input signal 136 to the actuator 112 to energize the actuator to move the head 108 to a target position or data track. As illustrated by line 138, the control system 130 provides position feedback to the controller 132 of the actual position of the head 108 in response to displacement of the actuator 112 and system disturbances 140. Feedback of the actual position of the head 108 relative to the target position of the head is used to provide a position error signal to energize or control the actuator 112 for desired head placement.

Figure 3:
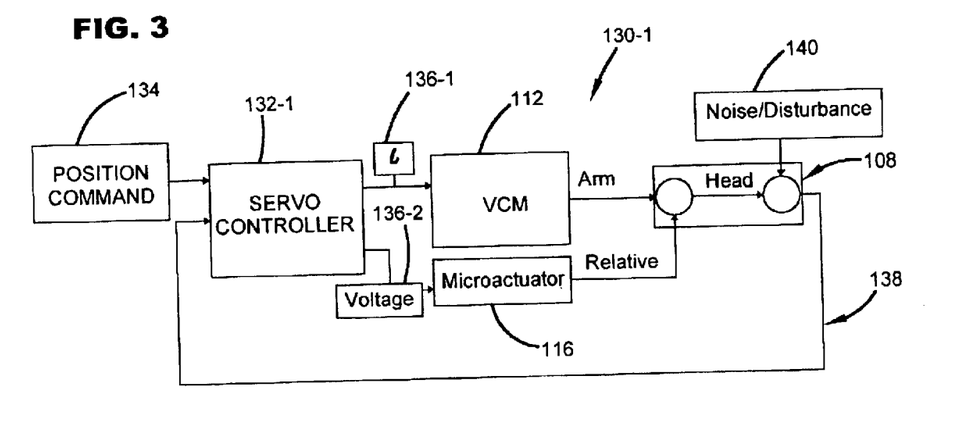
FIG. 3 is a schematic illustration of an embodiment of a control system for a dual stage actuator assembly of the present invention.

As previously discussed, to improve head positioning control, a secondary actuator or microactuator is included to provide dual stage actuation. The present invention provides a control system for an actuator assembly with multiple or dual stage actuators some of which have less displacement capability than others, an embodiment of which is illustrated in FIG. 3 where like numbers are used to refer to like parts in the previous figures. As shown, the controller 132-1 receives an input or seek command 134 and provides a signal or current 136-1 to energize the primary actuator or voice coil motor 112 and a signal 136-2 to energize the microactuator 116 to position the head 108 for read/write operations. As shown, signals 136-1, 136-2 energize actuators 112, 116 to collectively move the head 108 to the desired position.

As previously described, the control system includes a feedback loop 138 to provide position feedback to control the position of the head 108 in response to movement of the actuators 112, 116 and system disturbances 140 based upon servo position data. Although a particular control system is illustrated, application of the present invention is not limited to the specific system illustrated in FIG. 3 and the present invention can be applied to any dual stage servo system including a master/slave interconnect for the actuators 112, 116. Similarly, although only a position feedback 138 is shown, the present invention relates to any feedback architecture containing two or more actuators and one or more feedback signals.

Figure 4:
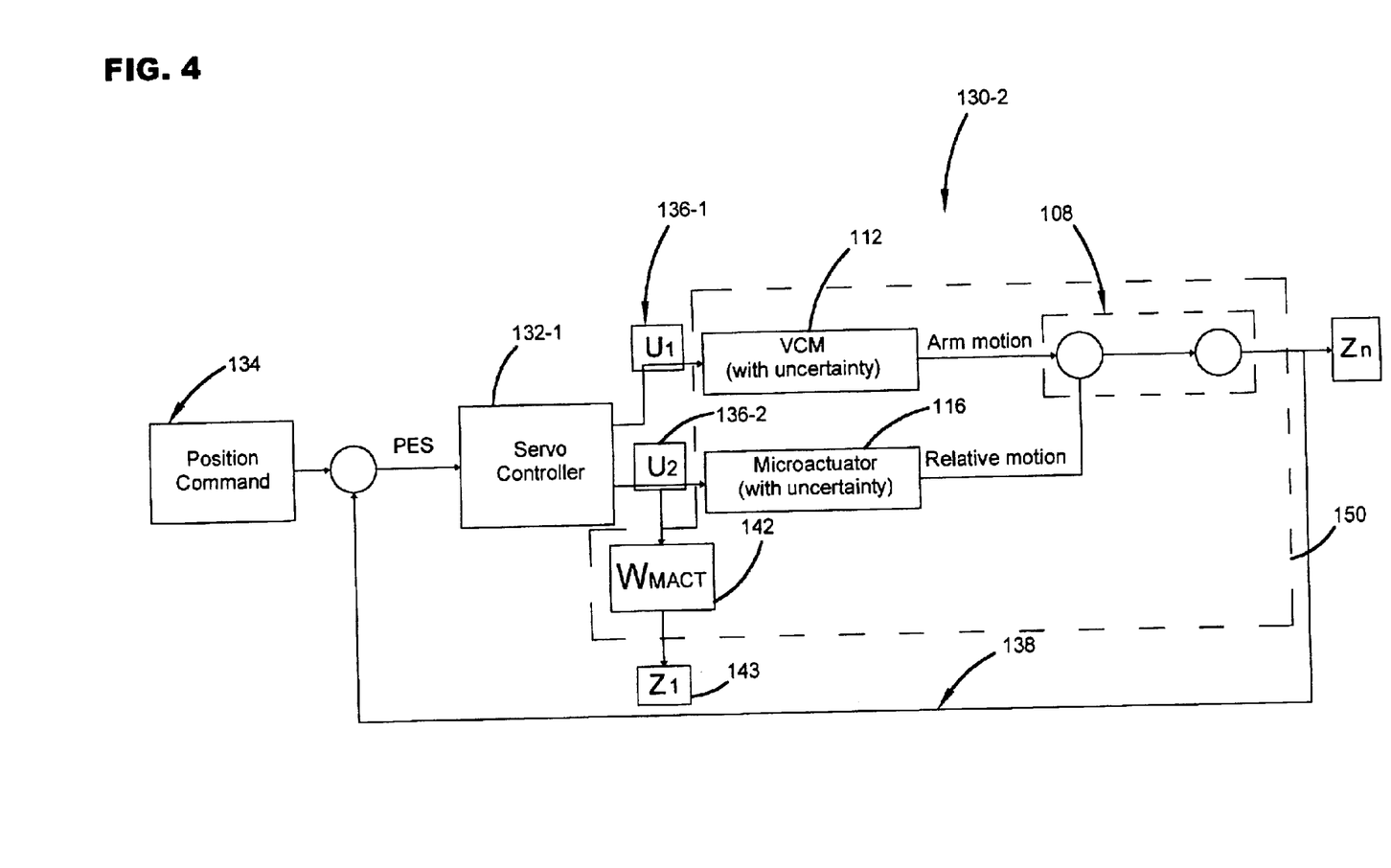
FIG. 4 is a schematic illustration of an embodiment of a control system incorporating a weight or constraint for a second actuator or microactuator for a dual stage actuator assembly.

FIG. 4 illustrates an embodiment of a control system 130-2 of the present invention. As illustrated the control system 130-2 includes a control weight or constraint 142 to control performance response or minimize stroke utilization of the secondary actuator or microactuator 116. The weight or constraint 142 limits or reduces microactuator stroke utilization as illustrated by block 143 so that the control system does not exceed performance parameters or physical limitations of the microactuator or secondary actuator 116.

In a preferred embodiment, the weight or constraint 142 consists of a frequency based filter that constrains the frequency content of the control signal 136-2 of the microactuator 116 as will be described. In an alternative embodiment illustrated in FIG. 5, the microactuator control weight or constraint 142-3 is at the output of the microactuator 116 rather than at the input as illustrated in FIG. 4 and application is not limited to the specific embodiments shown, as previously described.

Figure 6:
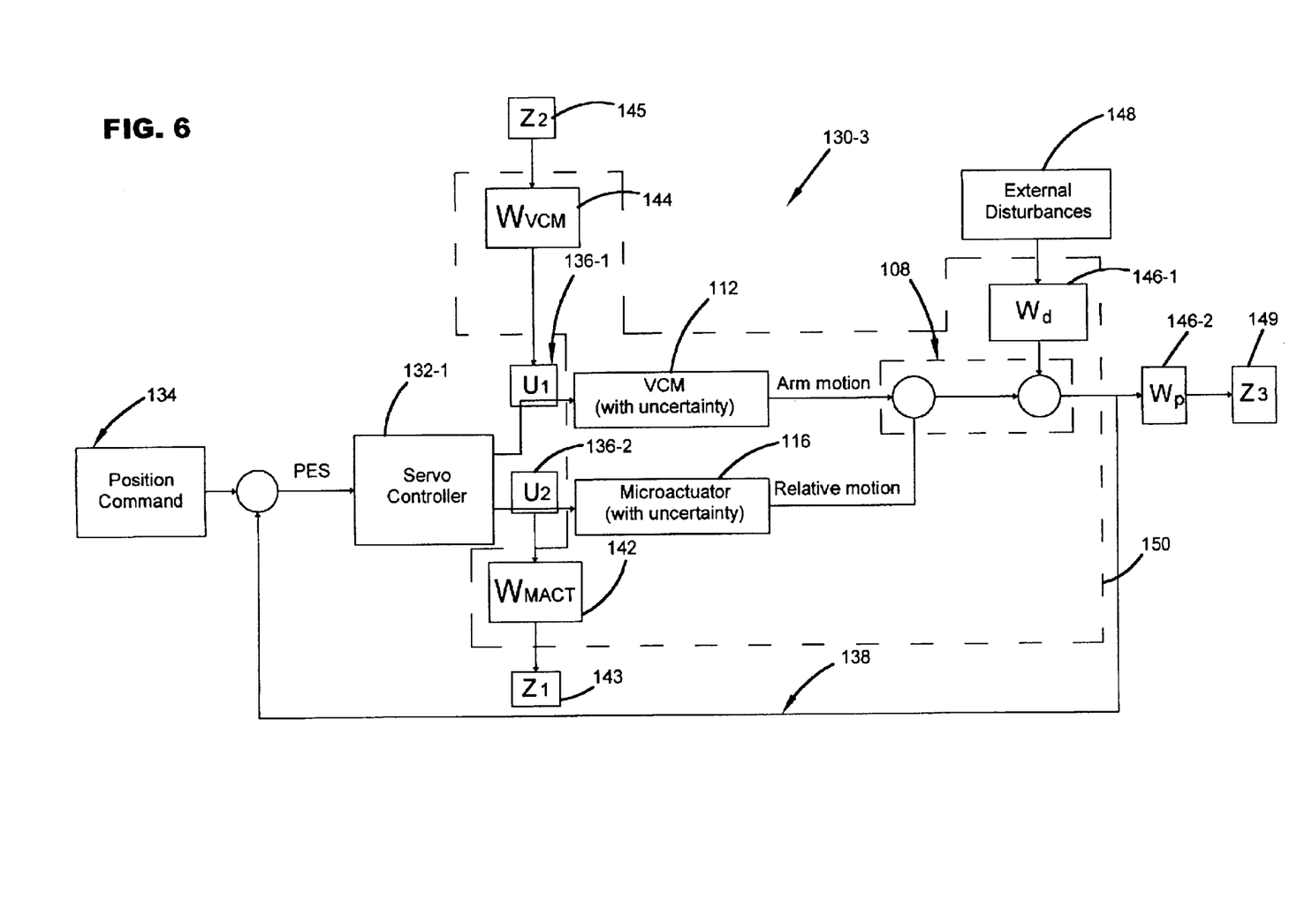
FIG. 6 is an alternate embodiment of a control system incorporating weights or constraints.

FIG. 6 illustrates an alternate embodiment of a control system 130-3 including a control constraint or weight 142 for the microactuator 116 and a control constraint or weight 144 for the primary actuator or VCM 112 to control stoke utilization as illustrated by block 145 to facilitate improved transition between the primary actuator and the secondary actuator or microactuator 116. Although, FIG. 6 illustrates a constraint weight 142, 144 for both the microactuator 116 and the primary actuator or VCM 112, application is not limited to a constraint for both the primary actuator 112 and secondary actuator or microactuator 116 and the system can include a constraint for the primary actuator 112 or secondary actuator 116 or both.

Also in the embodiment shown in FIG. 6, the control system includes at least one servo performance or control loop constraint such as 146-1, 146-2. In a particular or preferred embodiment shown, the control assembly includes servo performance constraints 146-1, 146-2 for system disturbances $W_d$ 148 and displacement $W_p$ 149, respectively, to control closed loop response of the servo loop or bandwidth. As will be appreciated by those skilled in the art, additional constraints, for example input disturbances to the VCM or primary actuator in block 112, can be accommodated by the methods described herein, and application of the present invention is not limited to a particular servo constraint.

Figure 5:
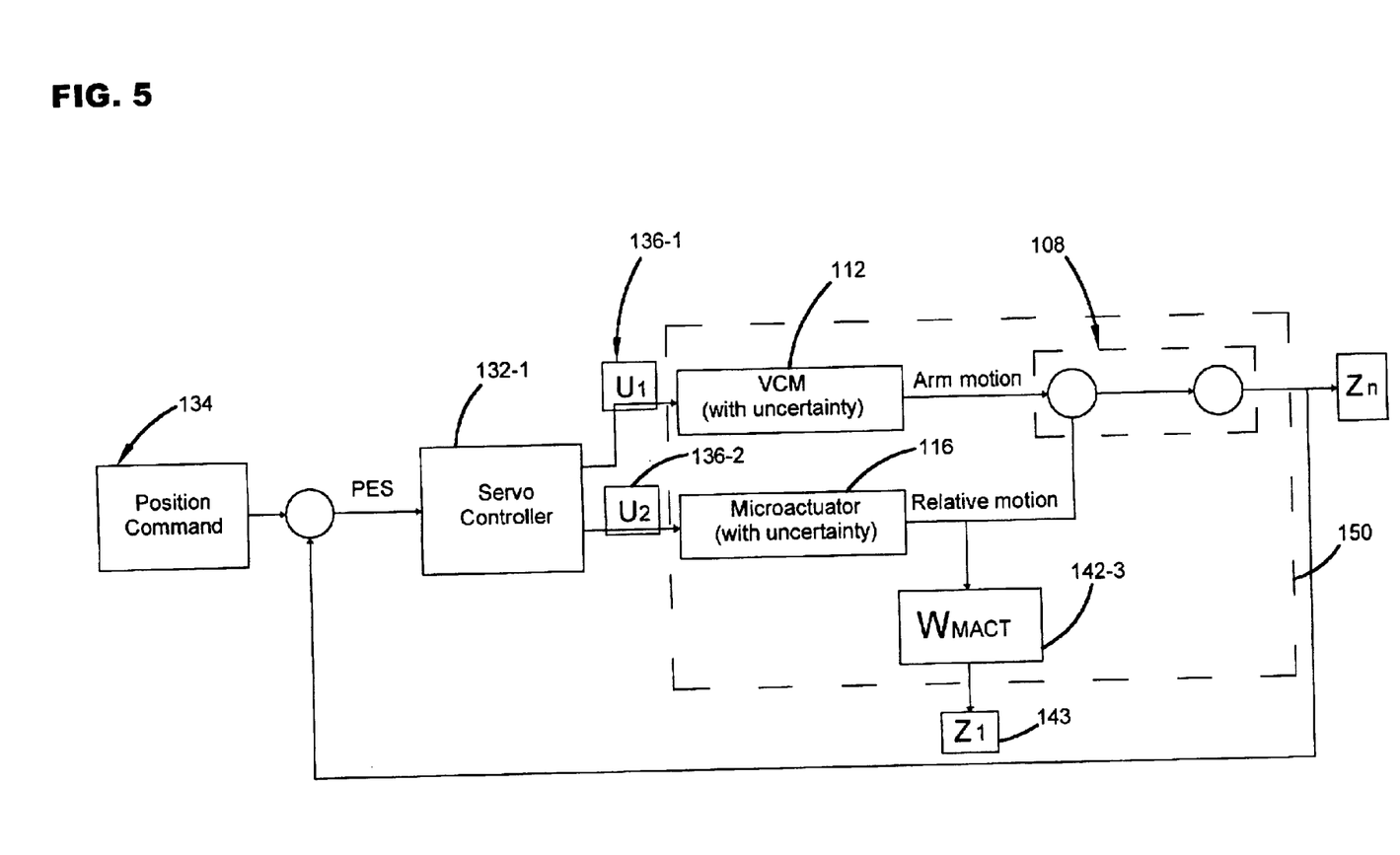
FIG. 5 is an alternate embodiment of a control system incorporating a weight or constraint for a second actuator or microactuator for a dual stage actuator assembly.
Figure 7:
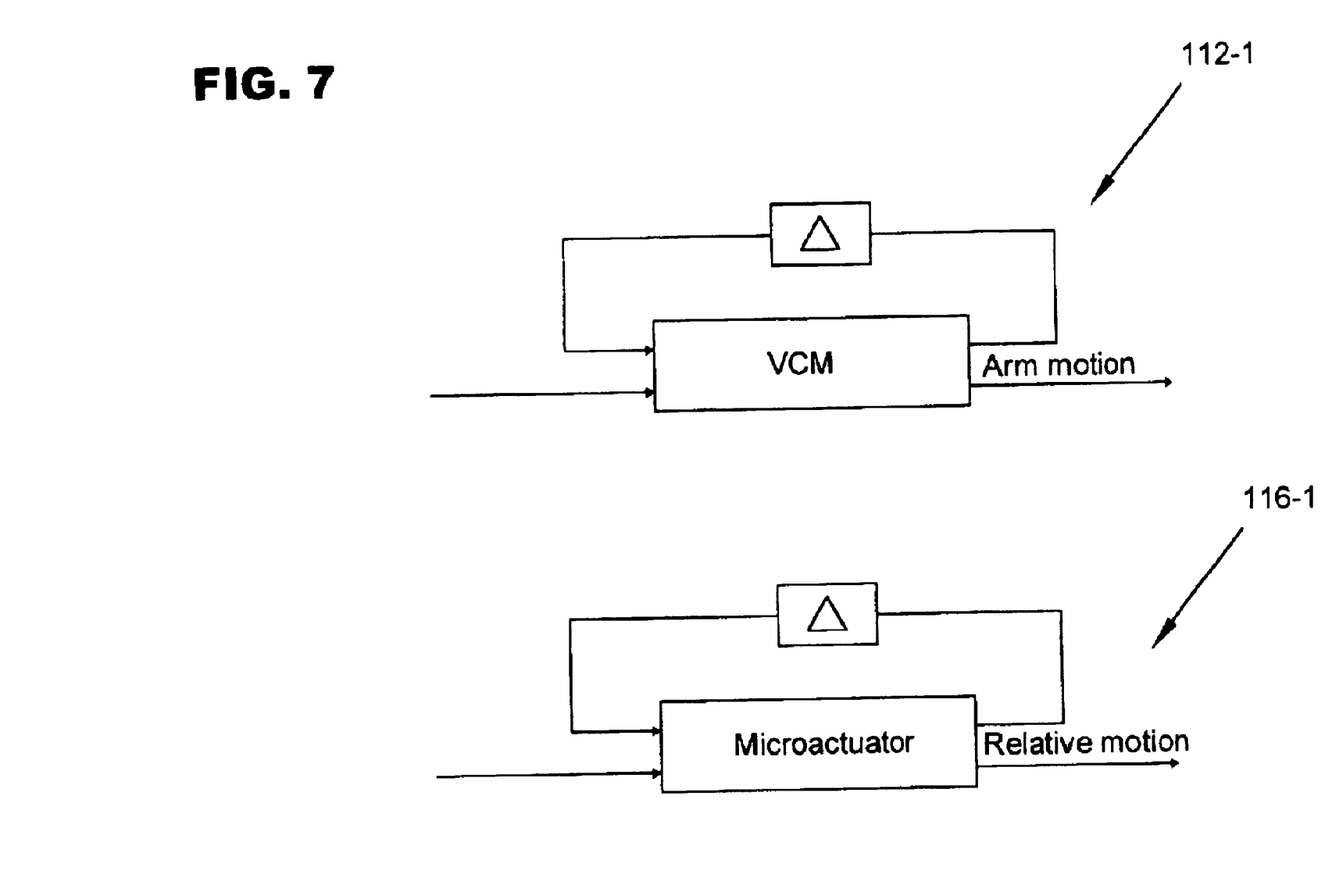
FIG. 7 schematically illustrates uncertainty models for a primary actuator or voice coil motor (VCM) and a secondary actuator or microactuator.

The constraints or weights 142, 144 or 146 are mathematical constraints which are mathematically determined. In particular, the constraints are mathematically derived using an iterative process to synthesize controller 132. In particular, the constraints are determined from a control synthesis block 150 as illustrated in FIGS. 4–6 to optimize the control system using uncertainty models 112-1, 116-1 for the actuators 112, 116 including an uncertainty mathematical model with structured uncertainty operator Delta Δ as illustrated in FIG. 7. In an illustrated embodiment, the control synthesis block 150 uses the uncertainty models 112-1, 116-1 for the voice coil motor and microactuator as illustrated in 152, 154 of FIGS. 8–9 to minimize utilized stroke and/or optimize control servo closed loop response.

Figure 8:
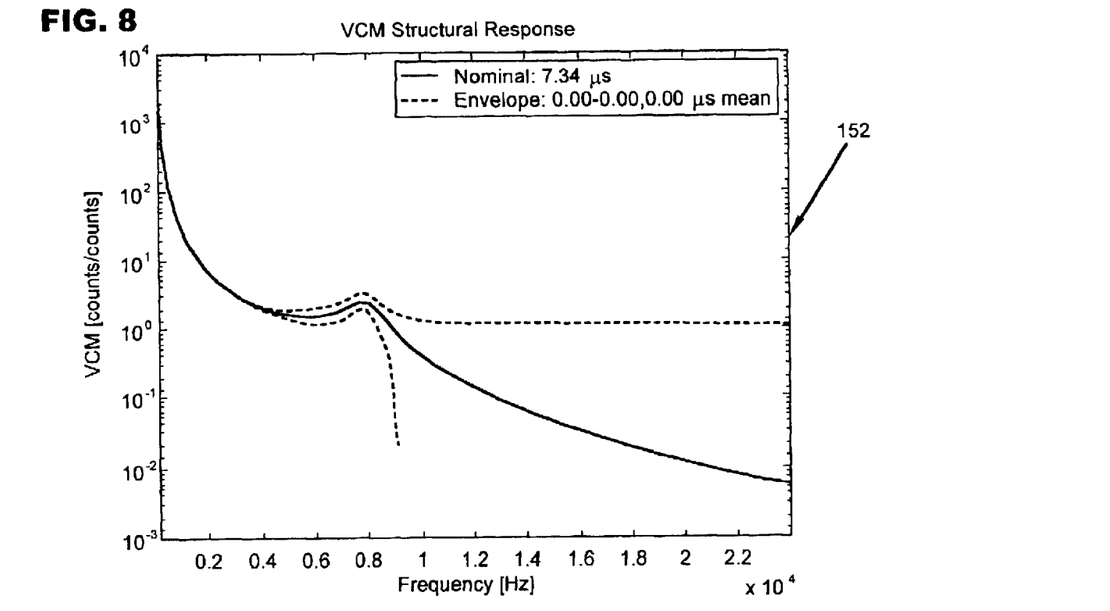
FIGS. 8–9 illustrate frequency response models for the first actuator or voice coil motor and second actuator or microactuator, respectively including model uncertainty envelopes.
Figure 9:
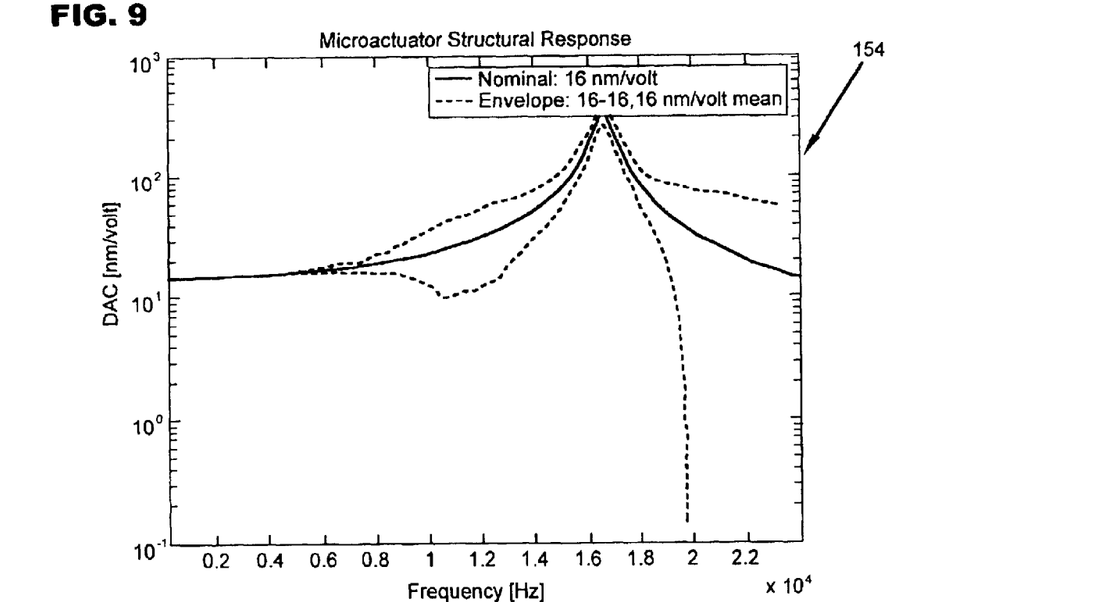

The uncertainty models as illustrated in FIGS. 8–9 provide a model uncertainty envelope for a frequency domain range to accommodate for design or dynamic variations of the actuators 112, 116. In particular as shown, the model envelope consists of envelopes in the operating frequency domain of the system. The control synthesis block 150 uses a control synthesis or loop-shaping program such as that available from MathWorks Inc. of Natick, Mass. (www.MathWorks.com) to optimize performance response for the system constraints using an iterative process based upon the uncertainty models 112-1, 116-1 for the voice coil motor and microactuator, respectively.

Figure 10:
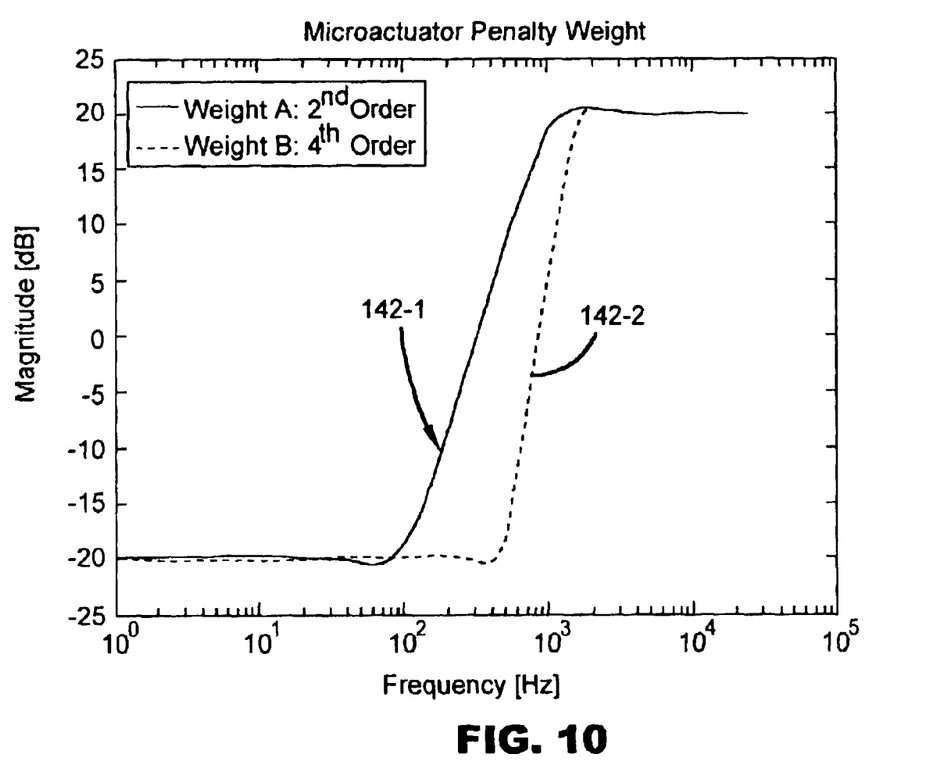
FIG. 10 graphically illustrates control weights or constraints for different control designs for the second actuator or microactuator.

FIG. 10 illustrates frequency response plots for modeling different control weights or constraints 142-1, 142-2 for the microactuator to synthesize controller 132-1. Control weight or constraints 142-1, 142-2 are frequency domain constraints and first constraint 142-1 is for a first control design and second constraint or weight 142-2 is for a second control design. As previously described, performance characteristics for different constraints or weights 142-1, 142-2 as illustrated in FIG. 10 are modeled iteratively for system optimization using the uncertainty models for the actuators 112, 116. As illustrated, control weight 142-1 allows greater microactuator motion for a frequency range below approximately 1000 Hz while control weight 142-2 allows less microactuator motion below approximately 1000 Hz.

Figure 11:
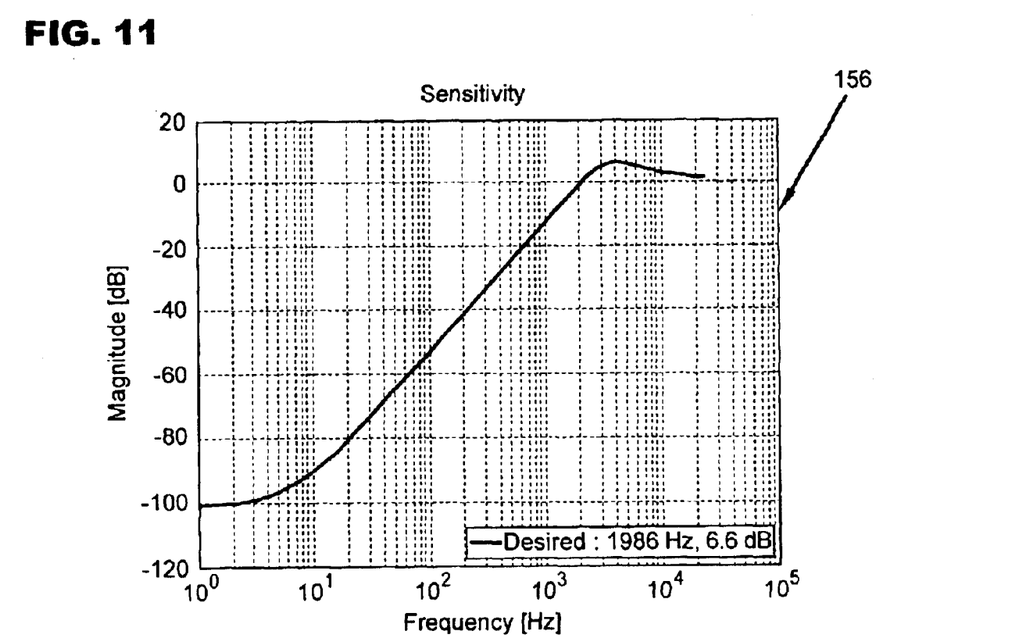
FIGS. 11–12 graphically illustrate frequency response for desired servo performance transfer functions that result from constraints or weights illustrated in FIG. 6.
Figure 12:
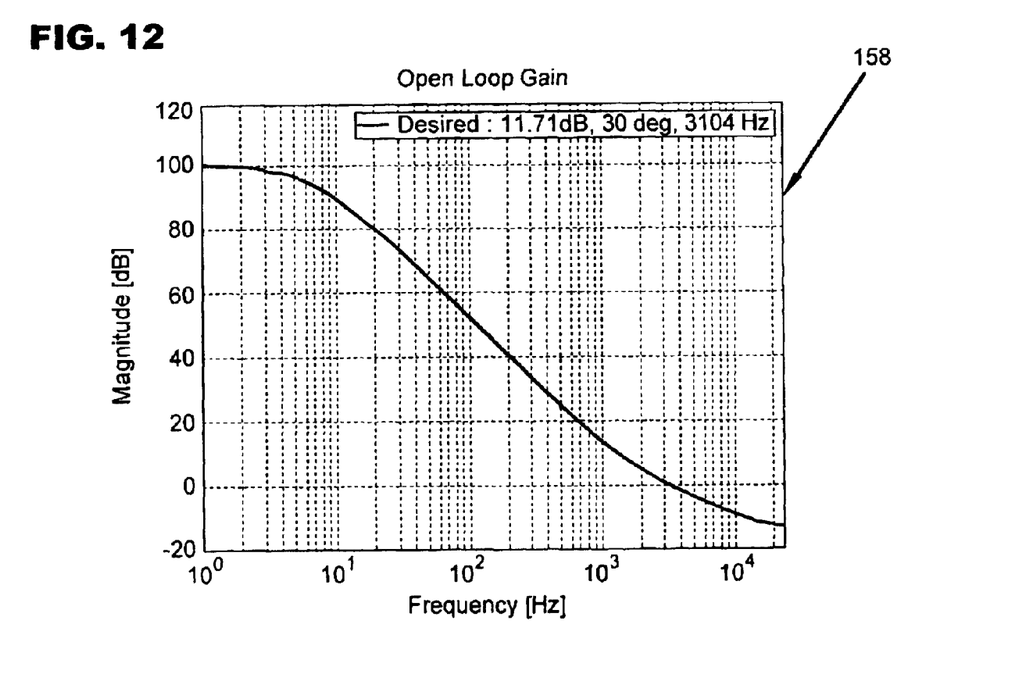

FIGS. 11–12 illustrate frequency response plots for modeling servo performance constraint or weights 146-1, 146-2 for sensitivity and open loop gain, respectively, to control response of the servo system and magnitude and frequency of the disturbance components. In particular FIG. 11 illustrates an inverse weight or constraint=$(W_d W_p)^{-1}$ for the frequency domain.

Figure 13:
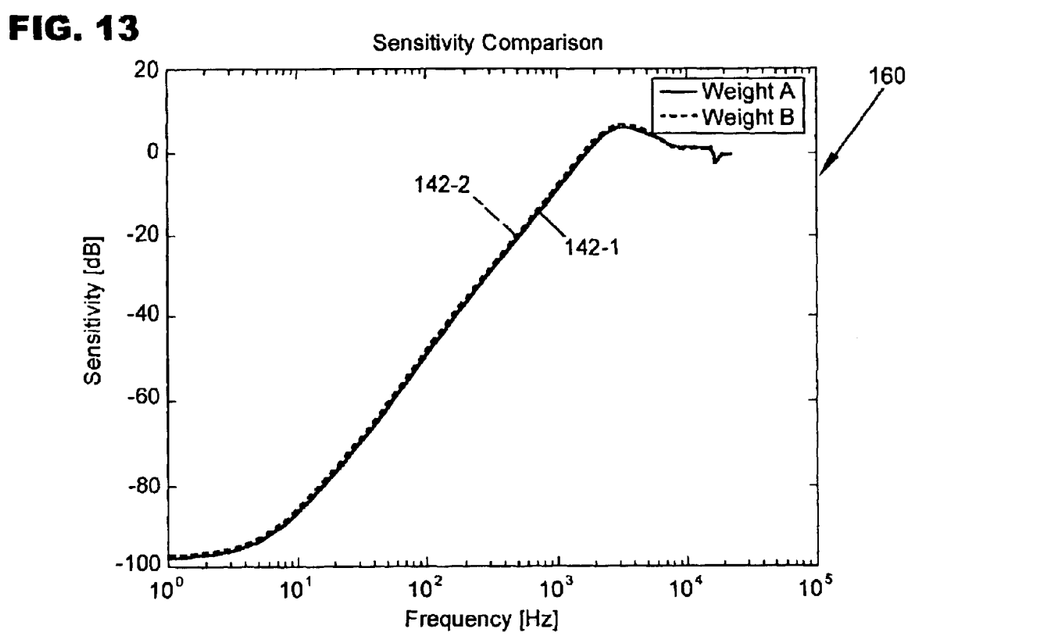
FIG. 13 graphically illustrates sensitivity response for modeled control constraints as illustrated in FIGS. 6, 8–9 and 10–12.
Figure 14:
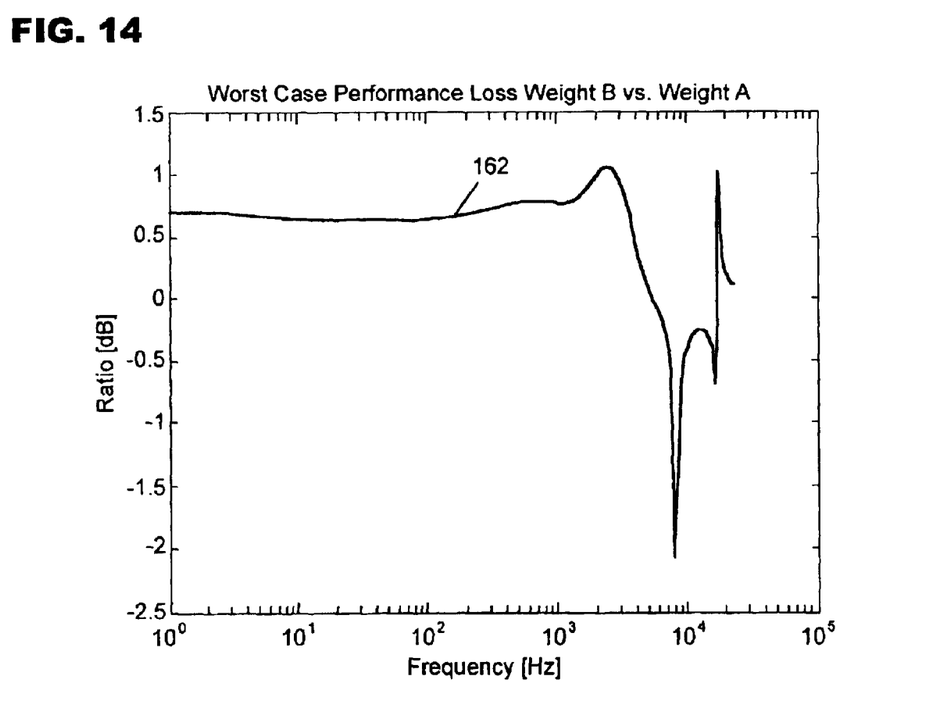
FIG. 14 graphically illustrates a ratio of the response for the control constraints illustrated in FIG. 13.

FIG. 13 illustrates a synthesized sensitivity frequency response 160 corresponding to microactuator control constraints 142-1, 142-2, performance weight 146-1, 146-2 and uncertainty models 112-1, 116-1 and FIG. 14 illustrates a ratio in the frequency domain of sensitivity response 162 corresponding to constraint or design 142-2 versus constraint 142-1. As illustrated at a low frequency range (<approximately 1000 Hz), design 142-2 has less than 1 db worse performance than constraint or design 142-1.

Figure 15:
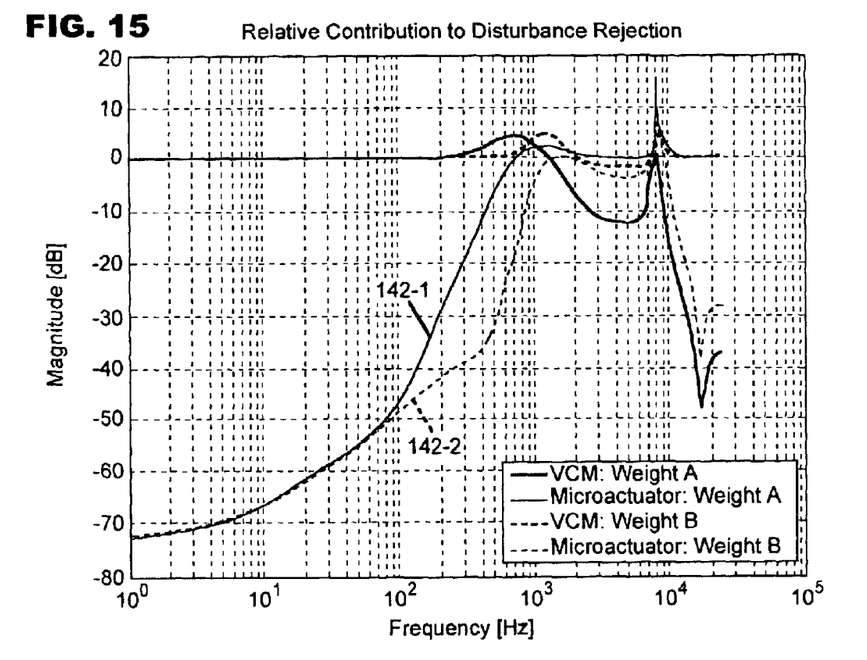
FIG. 15 graphically illustrates relative contribution to disturbance rejection for the control constraints illustrated in FIGS. 6, 8–9 and 10–12.
Figure 16:
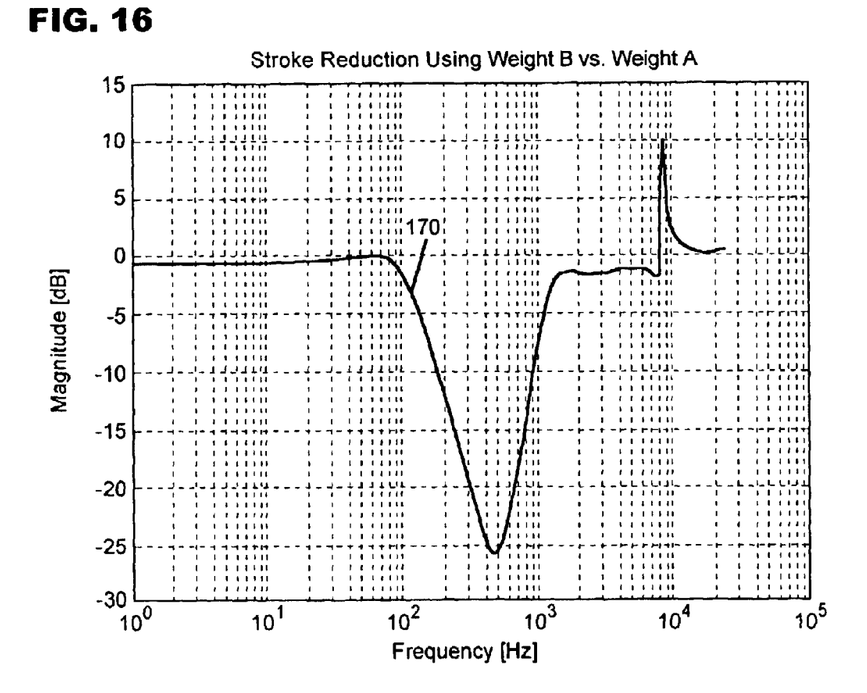
FIG. 16 graphically illustrates a ratio for stroke reduction for the control constraints illustrated in FIG. 15.

FIG. 15 illustrates a comparison of utilization of the voice coil motor and microactuator for constraints 142-1, 142-2. As shown, constraint 142-2 utilizes significantly less stroke compared to constraint 142-1 below 1000 Hz. Line 170 in FIG. 16 represents a ratio of microactuation stroke utilization for constraint 142-2 relative to constraint 142-1. As illustrated, constraint 142-1 requires as much as 25 db more microactuator stroke than control design 142-2.

Figure 17:
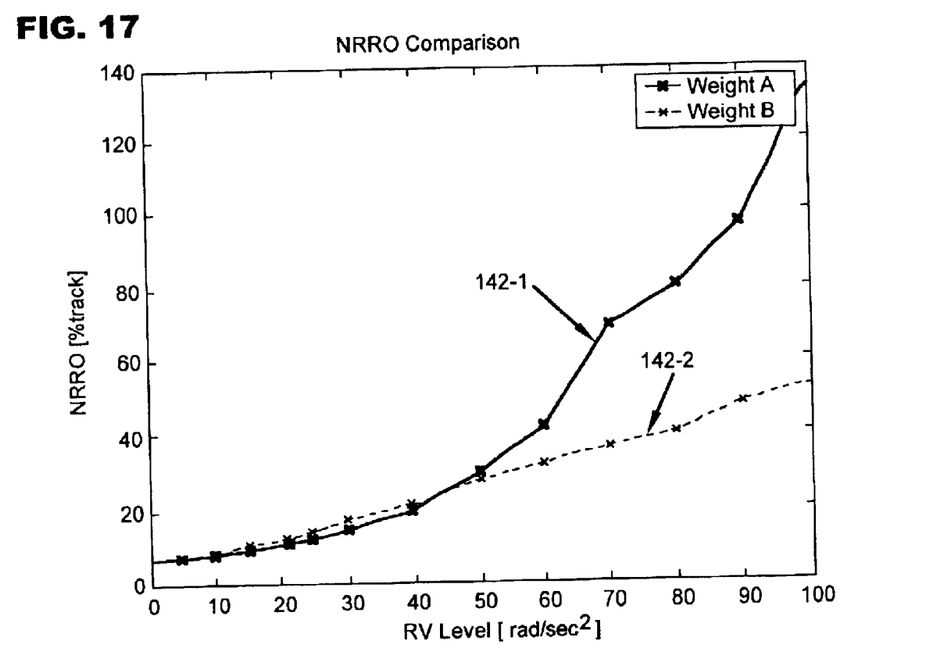
FIG. 17 graphically illustrates non repeatable run out (NRRO) for the control constraints illustrated in FIGS. 6, 8–9 and 10–12.
Figure 18:
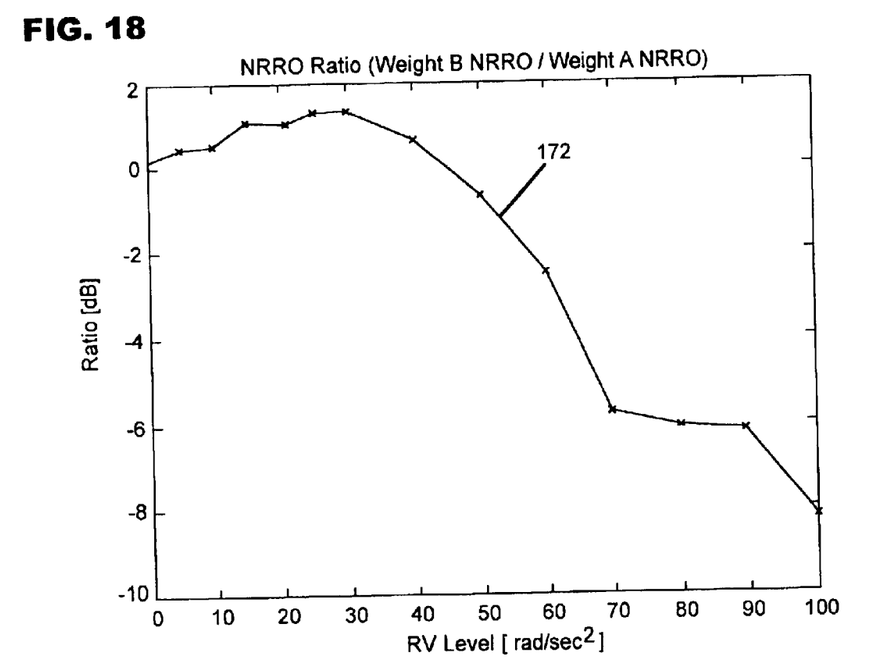
FIG. 18 graphically illustrates a ratio of NRRO for the control constraints illustrated in FIG. 17.

FIGS. 17–18 illustrate performance for control systems synthesized with the two constraints or weights 142-1, 142-2 in a drive or device under rotational vibration or RV excitation. FIG. 17 illustrates non repeatable run-out (NRRO) for constraints 142-1, 142-2 and line 172 in FIG. 18 illustrates a ratio of NRRO for constraint 142-2 relative to constraint 142-1. As shown in FIG. 17, constraint 142-1 enters stroke saturation at approximately 50 rad/sec$^2$ and requires anti-windup to preserve stability. As illustrated in FIG. 18, the control design for constraint 142-2 is less than 1.3 db (16%) worse than the control design for constraint 142-1 up to 50 rad/sec$^2$ disturbance. Above 50 rad/sec$^2$, constraint 142-2 is significantly better than constraint 142-1 since the control design using constraint 142-1 enters stroke saturation whereas the control design using constraint 142-2 never enters saturation.

Figure 19:
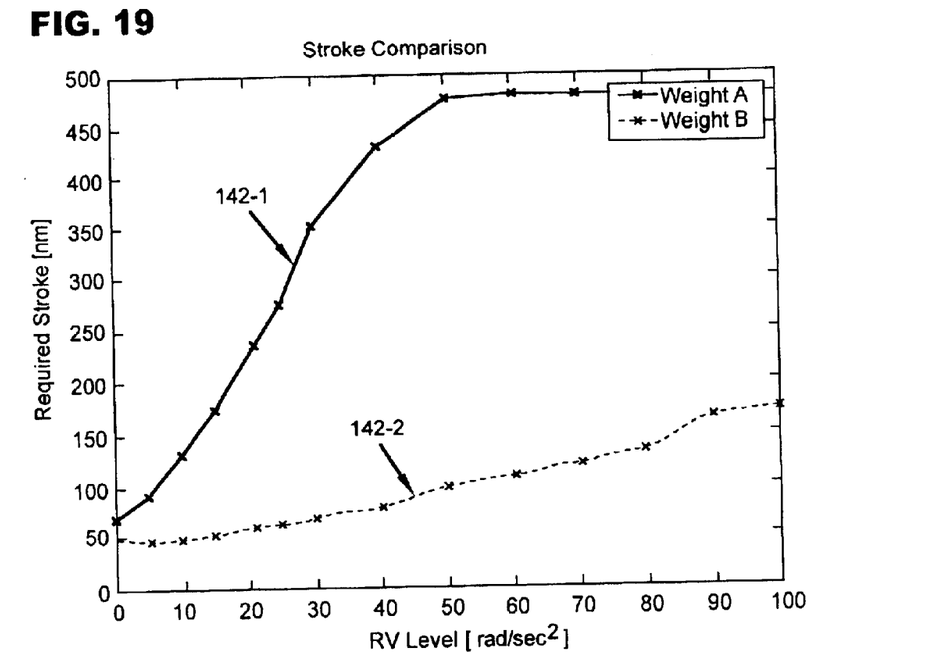
FIG. 19 graphically illustrates required stroke for different rotational vibration levels for the control constraints illustrated in FIGS. 6, 8–9 and 10–12.
Figure 20:
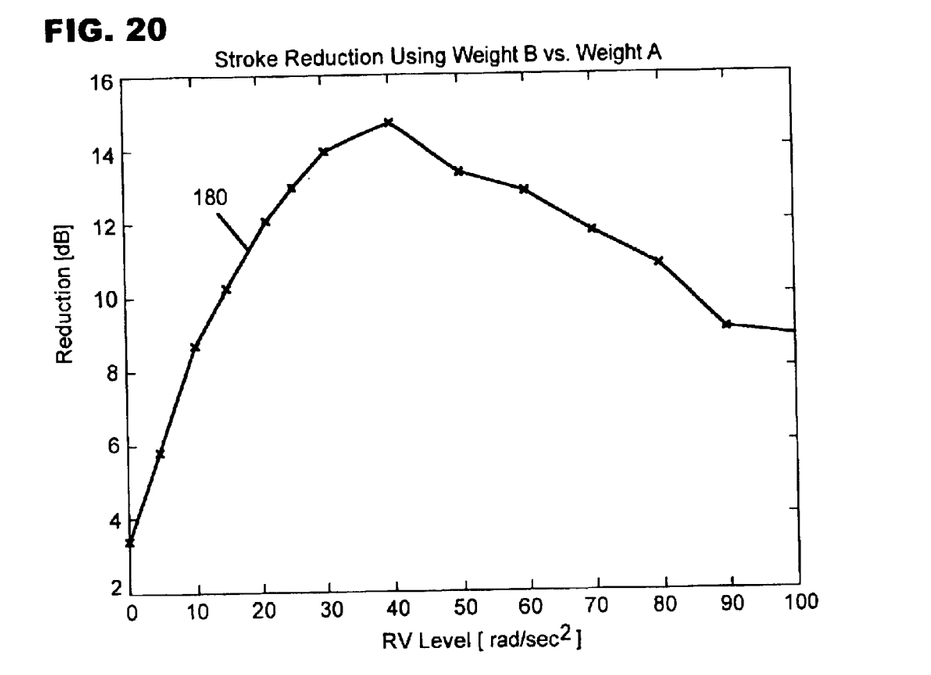
FIG. 20 graphically illustrates a ratio of the stroke for different rotational vibration levels for the control constraints illustrated in FIG. 19.

FIGS. 19–20 illustrate stroke comparisons for constraints or weights 142-1, 142-2 at different excitation levels. As shown, constraint 142-1 enters stroke saturation at approximately 50 rad/sec$^2$ and requires anti-windup to preserve stability. As shown by the ratio 180 in FIG. 20, the control design using constraint 142-1 requires 12 db (4 times) more stroke than the control design using constraint 142-2 at 21 rad/sec$^2$ which corresponds to the typical operational RV requirements for enterprise class disc drives. This reduction in stroke was obtained with less than a 12% increase in NRRO (or 1.3% track pitch) and as described constraint 142-2 provides optimum system performance relative to constraint 142-1 for head positioning control.

A control system (such as 130-1, 130-2, 130-3) for a data storage device is disclosed which includes a control constraint or weight (such as 142, 144, 146). In illustrated embodiments, the constraint or weight (such as 142, 144, 146) is a frequency based constraint and is used to control performance of one or more actuators. In particular, in the embodiments described, the weight or constraint (such as 142) is used to limit stroke utilization for a microactuator (such as 116) having a smaller stroke than a primary actuator. As described, a controller for a control system is synthesized using uncertain actuator models (such as 152, 154) and actuator utilization constraints (such as 142) or other constraints to optimize system performance and in a particular embodiment to minimize stroke utilized by the microactuator (such as 116) without compromising system performance.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular control system for particular application, it will be appreciated by those skilled in the art that the teachings of the present invention can be applied to other systems, without departing from the scope and spirit of the present invention.

What is claimed is:

1. An assembly comprising:
   a control system operably coupled to first and second actuators to provide control signals to the first and second actuators to move an associated head wherein the control system includes at least one constraint to constrain stroke utilization of at least one of the actuators.

2. The assembly of claim 1 wherein the at least one constraint is a frequency domain constraint.

3. The assembly of claim 1 wherein the control system includes a plurality of constraints to control stroke utilization of the first and second actuators.

4. The assembly of claim 1 wherein the at least one constraint is determined based upon an iterative process using mathematical models of the first and second actuators.

5. The assembly of claim 4 wherein the mathematical models of the first and second actuators include a mathematical model envelope for a frequency domain range.

6. The assembly of claim 1 wherein the control system further includes at least one servo control loop coupled to the head to provide feedback and a control loop constraint to control closed-loop response of the servo control loop.

7. The assembly of claim 6 wherein the control loop constraint is based upon at least one of system disturbance $W_d$ and displacement $W_p$.

8. The assembly of claim 6 wherein the control loop constraint is determined using mathematical models of the first and second actuators.

9. The assembly of claim 1 wherein the first actuator includes a voice coil motor and the second actuator is one of a piezoelectric microactuator, an electrostatic microactuator, an electromagnetic microactuator or a shape memory microactuator.

10. The assembly of claim 1 wherein the first actuator comprises a primary actuator which moves the associated head along a first stroke and the second actuator comprises a secondary microactuator which moves the associated head along a second smaller stroke and wherein the at least one constraint constrains stroke utilization of the second actuator.

11. A method comprising a step of:
energizing a first actuator coupled to a transducer and a second actuator coupled to the transducer using at least one constraint to control stroke utilization of at least one of the first actuator and the second actuator to position the transducer for operations.

12. The method of claim 11 wherein the step of energizing the first and second actuators uses feedback from a servo control loop and further comprising the step of:
controlling performance of a closed loop response of the servo-control loop based upon at least one servo control constraint.

13. The method of claim 11 wherein the second actuator is a microactuator having a smaller stroke than the first actuator and the step of energizing comprises constraining stroke utilization of the microactuator.

14. A method comprising steps of:
providing a mathematical model of an actuator energizable to position at least one head; and
synthesizing a response of the actuator using the mathematical model of the actuator to determine a constraint to control one of stroke utilization of the actuator and a closed loop response of a servo control loop coupled to the actuator.

15. The method of claim 14 wherein the mathematical model of the actuator includes an uncertainty envelope to accommodate various actuator designs for a desired frequency domain.

16. The method of claim 14 wherein the constraint is a frequency domain constraint.

17. A control system including the constraint synthesized using the method of claim 14.

* * * * *